United States Patent [19]

Viollaz et al.

[11] Patent Number: 5,377,986
[45] Date of Patent: Jan. 3, 1995

[54] PROCESS FOR MANUFACTURE OF A GOLF CLUB HEAD COMPRISING A MOUNTED HITTING SURFACE

[75] Inventors: Francois Viollaz, Evian; Robert Maestri, Alby sur Cheran, both of France

[73] Assignee: Taylor Made Golf Company, Inc., Carlsbad, Calif.

[21] Appl. No.: 24,368

[22] Filed: Mar. 1, 1993

[30] Foreign Application Priority Data

Feb. 27, 1992 [FR] France .................. 92 02555

[51] Int. Cl.⁶ ............................ A63B 53/04
[52] U.S. Cl. .......................... 273/173; 273/167 J
[58] Field of Search ............... 273/173, 167 H, 167 J, 273/167 R, 77, 78

[56] References Cited

U.S. PATENT DOCUMENTS

| | | | |
|---|---|---|---|
| 3,172,667 | 3/1965 | Baker et al. | 273/173 |
| 3,985,363 | 10/1976 | Jepson et al. | 273/173 |
| 4,023,802 | 5/1977 | Jepson et al. | 273/173 X |
| 4,438,931 | 3/1984 | Motomiya | 273/167 H |
| 4,667,963 | 5/1987 | Yoneyama | 273/78 X |
| 4,884,808 | 12/1989 | Retzer | 273/173 X |
| 4,964,641 | 10/1990 | Miesch et al. | 273/173 X |
| 5,024,437 | 6/1991 | Anderson | 273/173 X |
| 5,078,397 | 1/1992 | Aizawa | 273/169 X |
| 5,141,231 | 8/1992 | Cox | 273/173 |

FOREIGN PATENT DOCUMENTS 2132902A of 0000 United Kingdom .
2173407A of 0000 United Kingdom .

Primary Examiner—William E. Stoll
Attorney, Agent, or Firm—Pollock, Vande Sande & Priddy

[57] ABSTRACT

Process for manufacture of a golf club head incorporating a mounted hitting surface, comprising the steps of producing the body of the head from a series of metal plates, i.e., an upper plate, a lower plate, a peripheral plate, and a front plate comprising the front support face; bonding on its support face a hitting plate made of a plastic or composite material; and imparting to the hitting surface of the plate its final curved shape, which is convex toward the front.

8 Claims, 7 Drawing Sheets

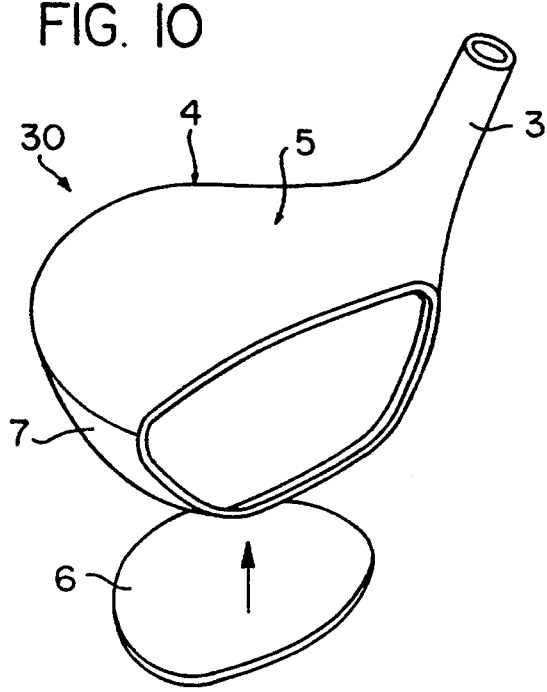
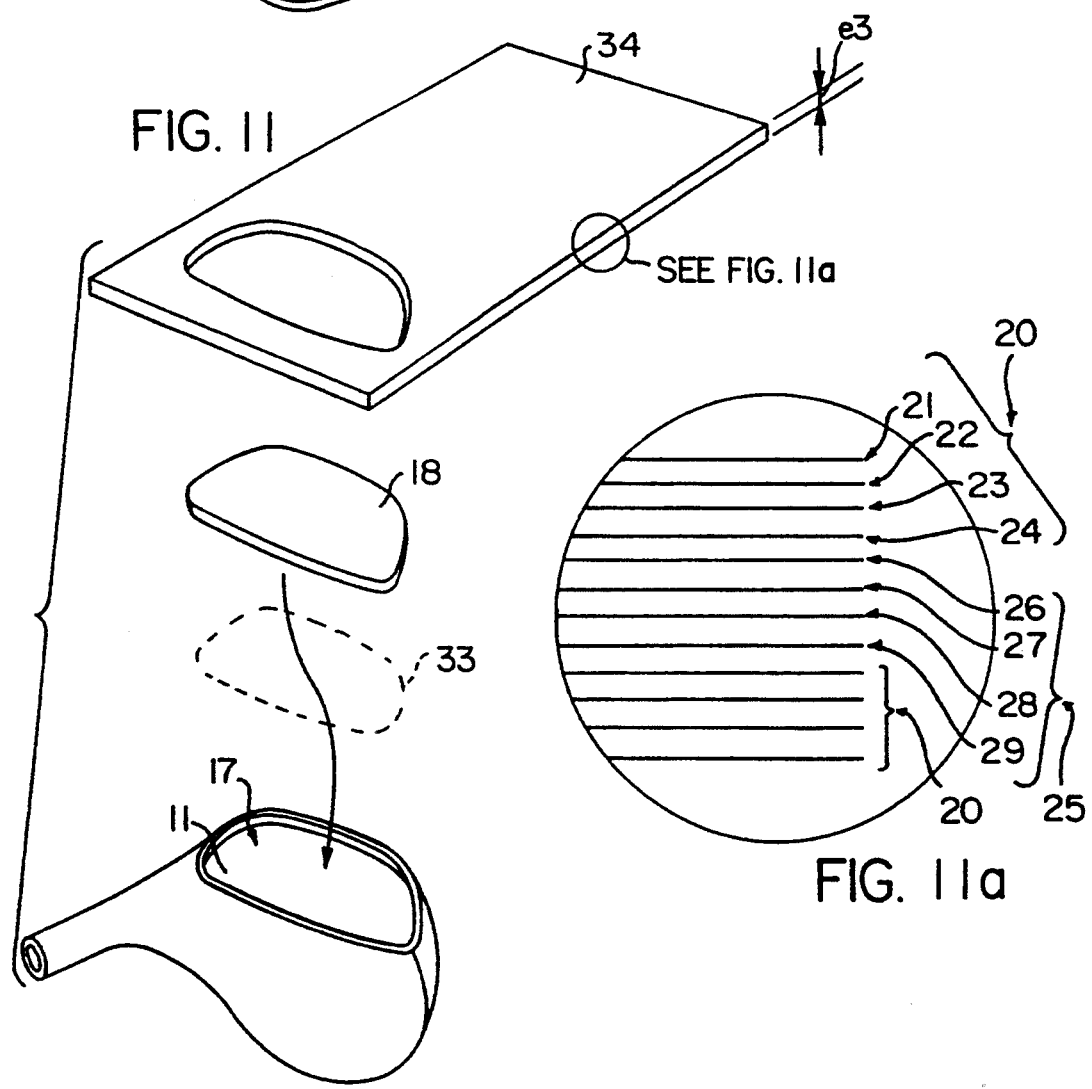

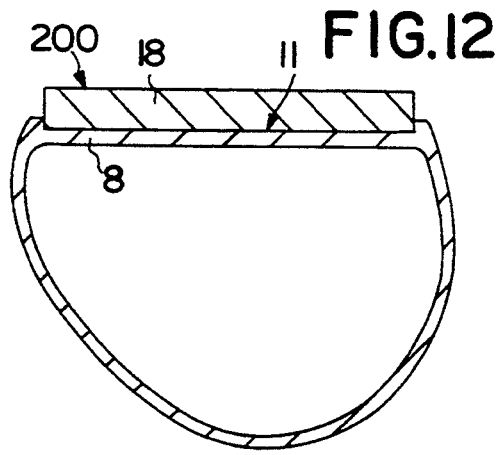
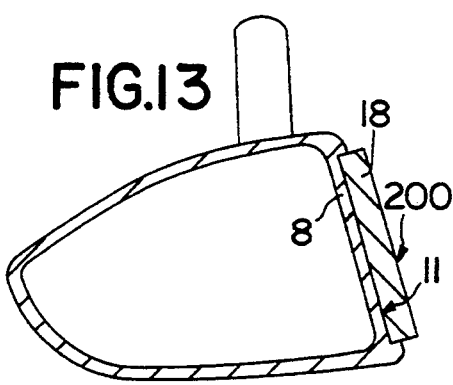
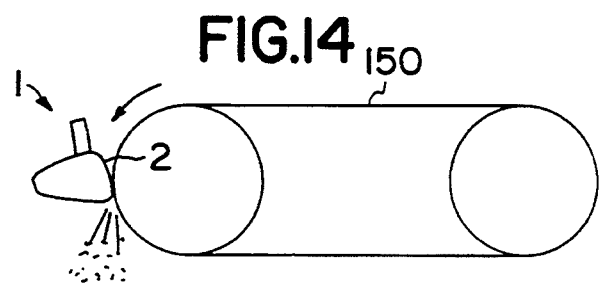
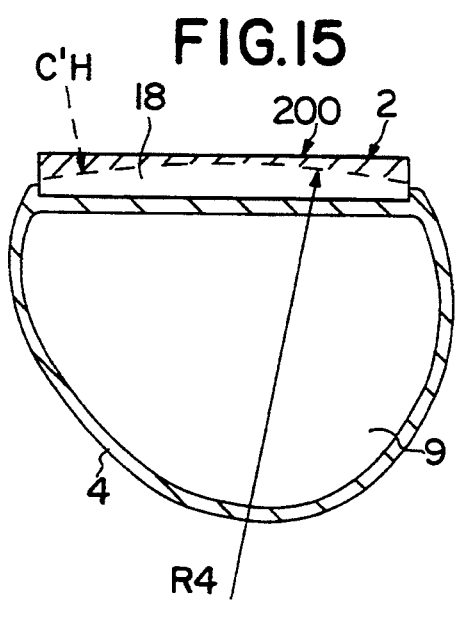
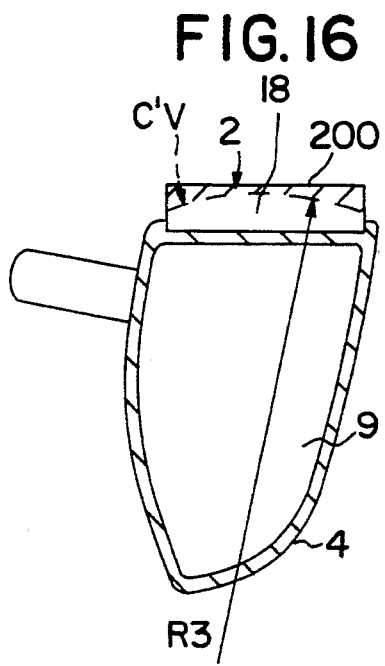

FIG. 17
FIG. 18
FIG. 19
FIG. 20
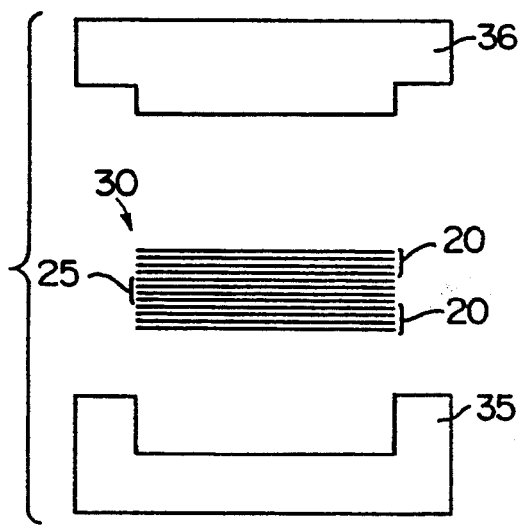
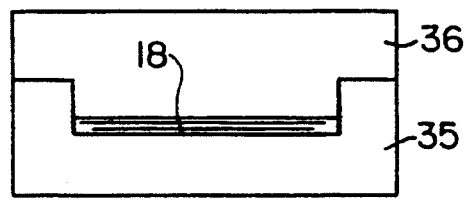
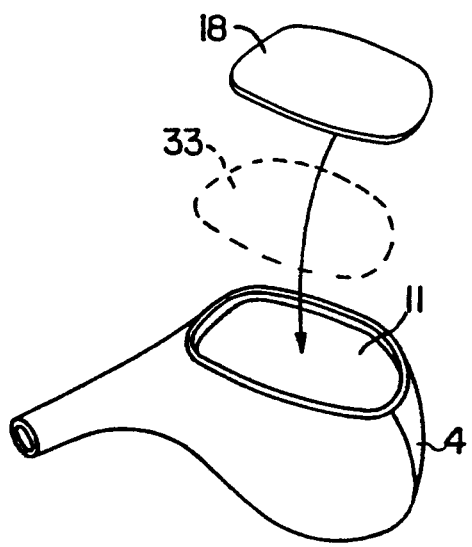
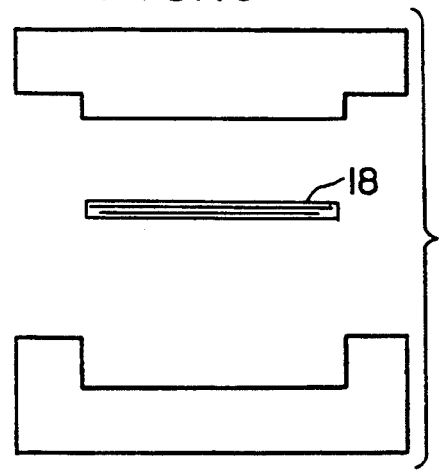

PROCESS FOR MANUFACTURE OF A GOLF CLUB HEAD COMPRISING A MOUNTED HITTING SURFACE

FIELD OF THE INVENTION

The present invention relates to a process for the manufacture of golf club heads, and, more specifically, those on which a hitting surface is mounted. When golfing, the golfer strikes the ball to move it, driving it with a golf club constituted by a shaft which incorporates a head at its lower end, while its upper end is equipped with a handle, often called a grip.

BACKGROUND OF THE INVENTION

At present, the clubs used by golfers at the tee, or starting area, to drive the ball over long distances are called woods. Woods were originally constructed, in their entirety, of wood materials, such as persimmon or other similar varieties. These clubs are still prized by many golfers, but their performance tolerances are narrow, because of the low density of the material used and its homogeneous distribution behind the impact surface of the club head.

To remedy this disadvantage, the "wood-metal" club was created, a club which reproduces the shape of the wood, but whose head is made entirely of steel. Because of the high density of the material used and the necessary weight constraints, wood-metal clubs generally incorporate a hollow steel head, normally manufactured using the lost wax casting process. In this type of construction, the weight, which is mainly distributed on the periphery of the impact surface, imparts to the club a tolerance which is clearly greater than that of conventional woods. This tolerance applies both to the angle at which the ball leaves the club, an angle which determines the vertical trajectory of the ball, and to the deviation of the ball, i.e., to its lateral trajectory.

A first disadvantage of wood-metal clubs lies in the unpleasant sensations experienced by the golfer at the time of impact and caused by the contact of the metal face with the ball.

Another problem arises from the fact that the stiffness of the steel impact surface, whose thickness must be sufficient to absorb the shock of the blow, is not optimal. It can be demonstrated that reduced stiffness of the surface increases the speed of restitution, thus increasing the distance of flight, and that the stiffness of the surface depends on the thickness of the impact surface and on the modulus of elasticity of the material. For a given modulus of elasticity, reduced stiffness is, therefore, directly linked to a reduction of the thickness of the impact. It is today apparent that the optimal degree of stiffness of the impact surface of a wood-metal club corresponds to an excessive thinness, i.e., less than 3 millimeters, thus leading to irreversible deformation.

According to a well-known arrangement, the hitting surface of wood-type club heads is not planar, as is the case for irons, but is rounded in both vertical and horizontal cross-sections. The purpose of these curvatures is to correct the trajectory of the ball, more particularly when the point of impact of the blow is not located exactly in the center of the surface.

SUMMARY OF THE INVENTION

The object of the present invention is thus to propose a process for manufacture of a golf club head, in particular a wood, incorporating a new construction which communicates pleasing sensations to the golfer at the time of impact and which ensures good ball trajectory. The invention is also intended to propose a head whose tolerance is identical to that of conventional club heads of the same type, in particular of wood-metal clubs, but whose stiffness may be optimally selected, thereby making it possible to increase the contact time of the ball on the impact surface, and thus, simultaneously, the speed with which the ball leaves the club and the feeling of ball control.

Accordingly, the process for manufacture, according to the invention, of a golf club head comprising a mounted hitting plate consists of the following steps:

(a) production of the body of the head itself, using a series of metal plates (b) adhesive bonding, to its support face, of a hitting plate whose thickness is substantially constant and which is made of a plastic or composite material; and (c) machining in order to impart to the hitting face of the plate its final curved shape made convex toward the front.

According to this process, the body of the head itself is made of a series of metal plates, i.e., an upper plate, a lower plate, a peripheral plate, and a front plate incorporating the front support face, while the hitting plate is made of a composite material. According to a preferred configuration, the hitting plate consists of a stack of multiple sheets woven of resin-impregnated carbon and/or aramid fibers.

According to one of the process variants, the hitting plate is cut from a plate, before being bonded to the support surface of the front plate of the body of the head, while, in another variant, the hitting plate is molded separately in a mold, before then being bonded to the support face of the front plate, and, in a subsequent operation, the front surface of the hitting plate is machined in order to give it its final curve(s).

BRIEF DESCRIPTION OF THE DRAWINGS

Other features of advantages of the invention will emerge from the following description corresponding to the attached drawings, which are provided only by way of example.

FIG. 1 is a front view of the club head according to the invention.

FIG. 2 is a lateral view in the direction of arrow F in FIG. 1.

FIG. 3 is a top plan view.

FIG. 4 is a vertical cross-section along line IV—IV in FIG. 1.

FIG. 5 is a horizontal cross-section along line V—V in FIG. 2.

FIG. 6 is a perspective view.

FIG. 7 is a perspective view of the head without its hitting plate.

FIGS. 8 and 9 are perspective views illustrating, more especially, the way in which the mounted hitting surface is formed.

FIGS. 10 to 21 illustrate the different manufacturing procedures.

FIGS. 10 illustrates a preliminary step common to all of the procedures.

FIGS. 11 to 16 illustrate the different steps involved in a first procedure.

FIG. 11 is an exploded view illustrating the operation following a preliminary step.

FIGS. 12 and 13 illustrate the club head before machining of the hitting surface. FIG. 12 is a view similar to FIG. 5, while FIG. 13 is a view similar to FIG. 4.

FIG. 14 illustrates the operation in which the hitting surface is shaped.

FIGS. 15 and 16 are views similar to FIGS. 12 and 13, showing the club head and its machining operation.

FIGS. 17 to 20 illustrate a second embodiment of the process.

DESCRIPTION OF THE PREFERRED EMBODIMENT

Figure 1:
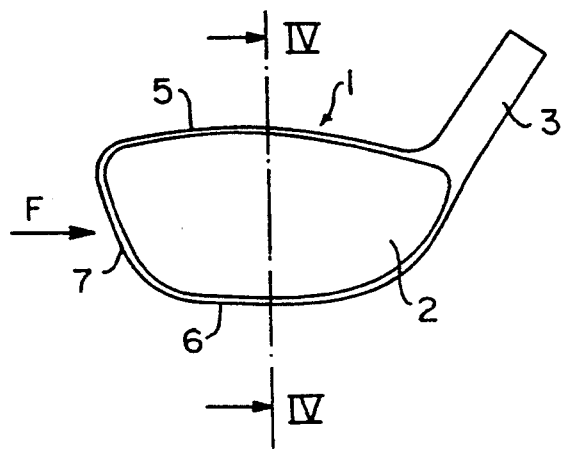
FIGS. 1 to 9 illustrate an embodiment of the golf club head according to the invention.
Figure 2:
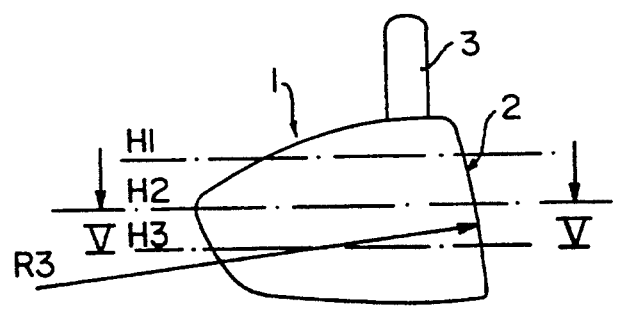
Figure 3:
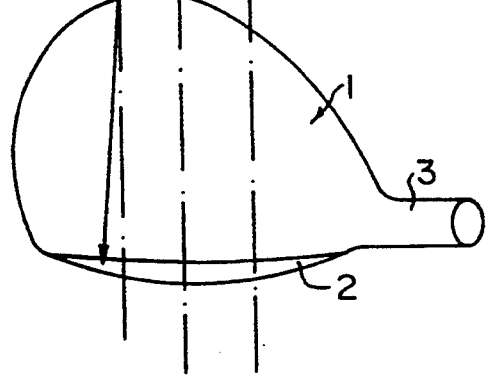
Figure 4:
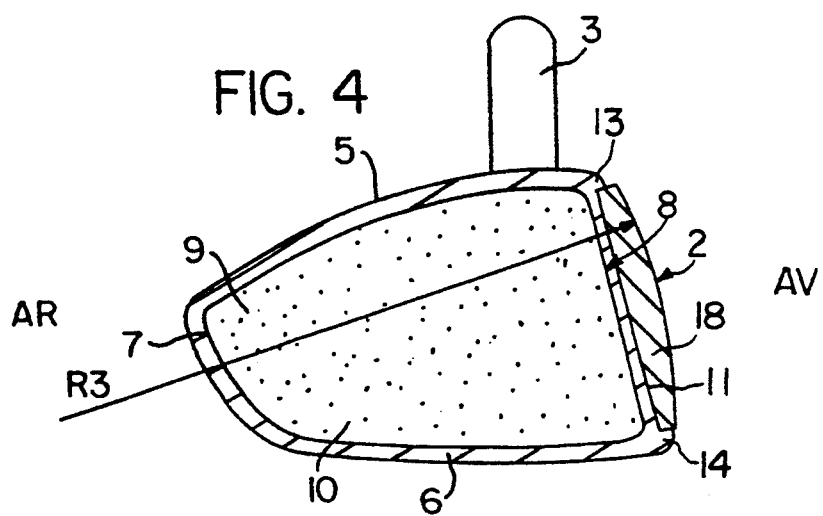
Figure 5:
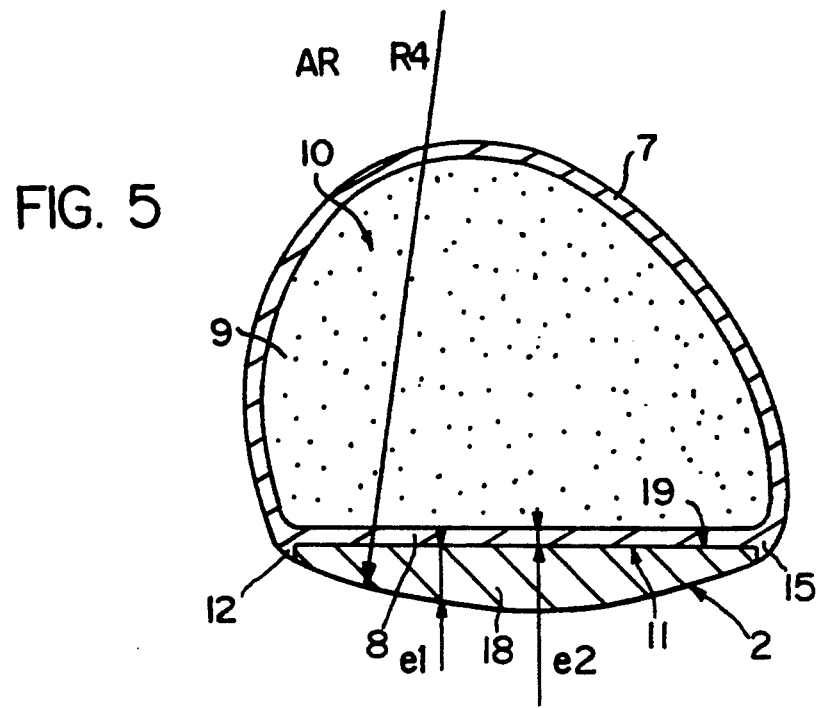
Figure 6:
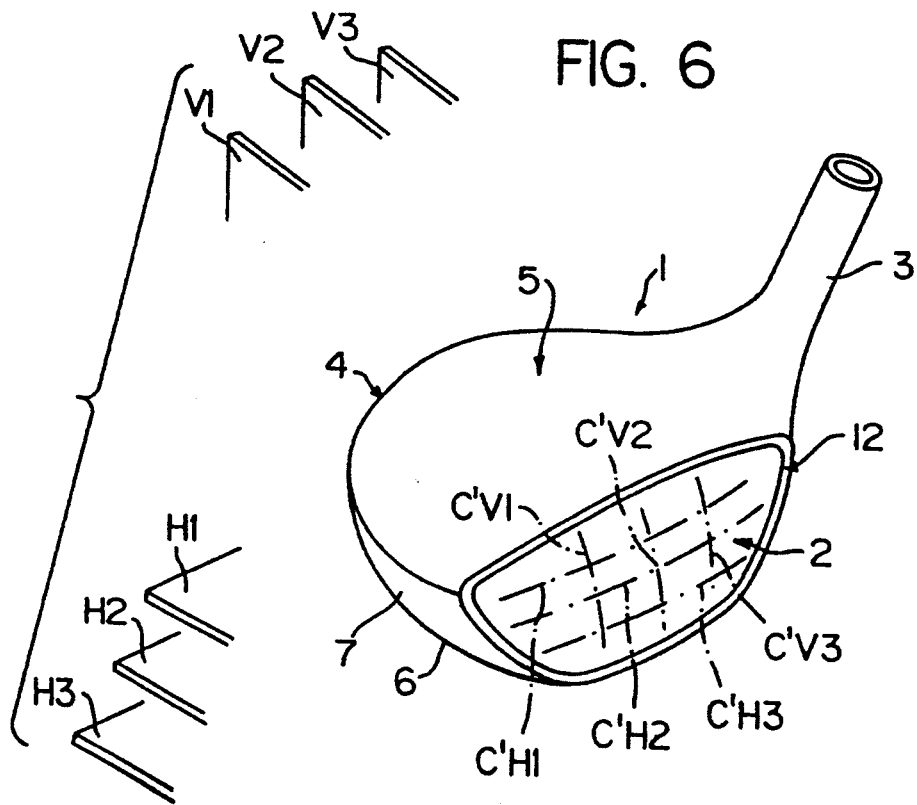
Figure 7:
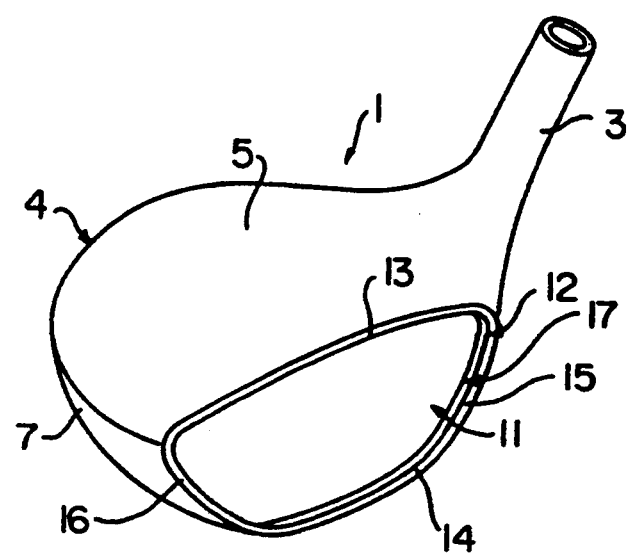

The club head according to the invention is a wood and comprises, as illustrated in FIGS. 1 to 9, a shell 1 comprising a hitting surface 2 and extended laterally and upward by a neck 3 in which the club shaft is designed to be inserted. The shell 1 itself is formed by a metal casing 4 constituted by a series of plates, i.e., an upper plate 5, a lower plate 6, a peripheral plate 7, and a front plate 8. These different plates form a sealed hollow body creating an interior cavity 9 advantageously filled with foam 10, such as polyurethane foam.

The front plate 8 is such that its front support surface 11 is a flat surface. Moreover, the upper plate 5, the lower plate 6, and the peripheral plate 7 are curved plates, as in conventional applications. Advantage is gained when the front plate comprises a small peripheral shoulder 12 which protrudes forward, formed by an upper, a lower, an inner, and an outer edge, 13, 14, 15, and 16, respectively, which constitute the support face 11; and a front recess 17 in which a mounted hitting plate 18 is, according to the invention, designed to fit.

The hitting plate 18 is, according to the invention, an independent component made of a composite material, which has a substantially constant thickness "e1" and is assembled to the support face 11 of the front plate 8 by adhesive bonding, as will be explained below. In its assembled position illustrated in FIGS. 4, 5, and 6, the hitting surface 2 of the hitting plate 8 is curved in all directions, i.e., it is rounded and convex toward the front AV. Accordingly, the different points of intersection between the hitting face 2 of the hitting plate 18 and the vertical planes V1, V2, V3, etc., are curves C′V1, C′V2, C′V3, etc., having radius "R3." Similarly, the different points of intersection between hitting surface 2 and the horizontal planes H1, H2, H3, etc., are curves C′H1, C′H2, C′H3, etc., having radius "R4," R3 being advantageously equal to R4. Of course, the rear face 19 of the hitting plate 18 is flat, in order to conform to the support face 11 against which it is adhesively bonded.

As regards composite materials, applicants intend the use of sheets woven of carbon and/or aramid fibers impregnated with a thermoplastic or duroplastic resin material. The fibers preferred by applicant include long carbon fibers possessing a high degree of mechanical strength and a modulus of elasticity which can vary from 230 to 590 GPa, and a rupture strength of between 2,450 and 7,000 MPa. These values are obviously greater than those of conventional steels. The matrices or resins may be of the polyphenylene sulfide (PPS), imide polyether (PEI), polyether-ether-ketone (PEEK), or epoxy type.

The hitting plate 18 is preferably constituted by a stack of multiple sheets woven from fibers, e.g., two-directional fibers. The specific orientation of the fibers used to make each woven sheet is illustrated by way of example in FIG. 9. In this example, the plate comprises a first group 20 of sheets (21, 22, 23, 24) whose fibers are oriented, first, in the direction of the horizontal axis (X—X′) and second, in the direction of the vertical axis (Y—Y′). The plate also comprises a second group 25 of sheets (26, 27, 28, 29) whose orientation is offset by +45° and −45° in relation to the horizontal axis X—X′. The plate preferably incorporates a successive stacking of from 10 to 25 fiber sheets (20, 25).

Figure 8:
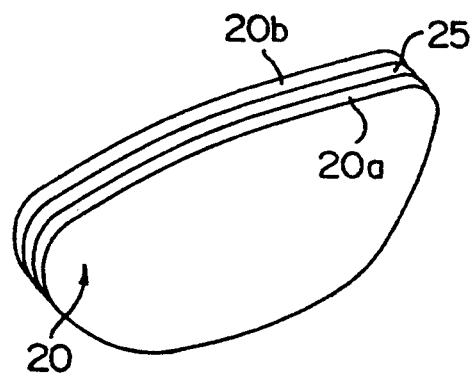
Figure 9:
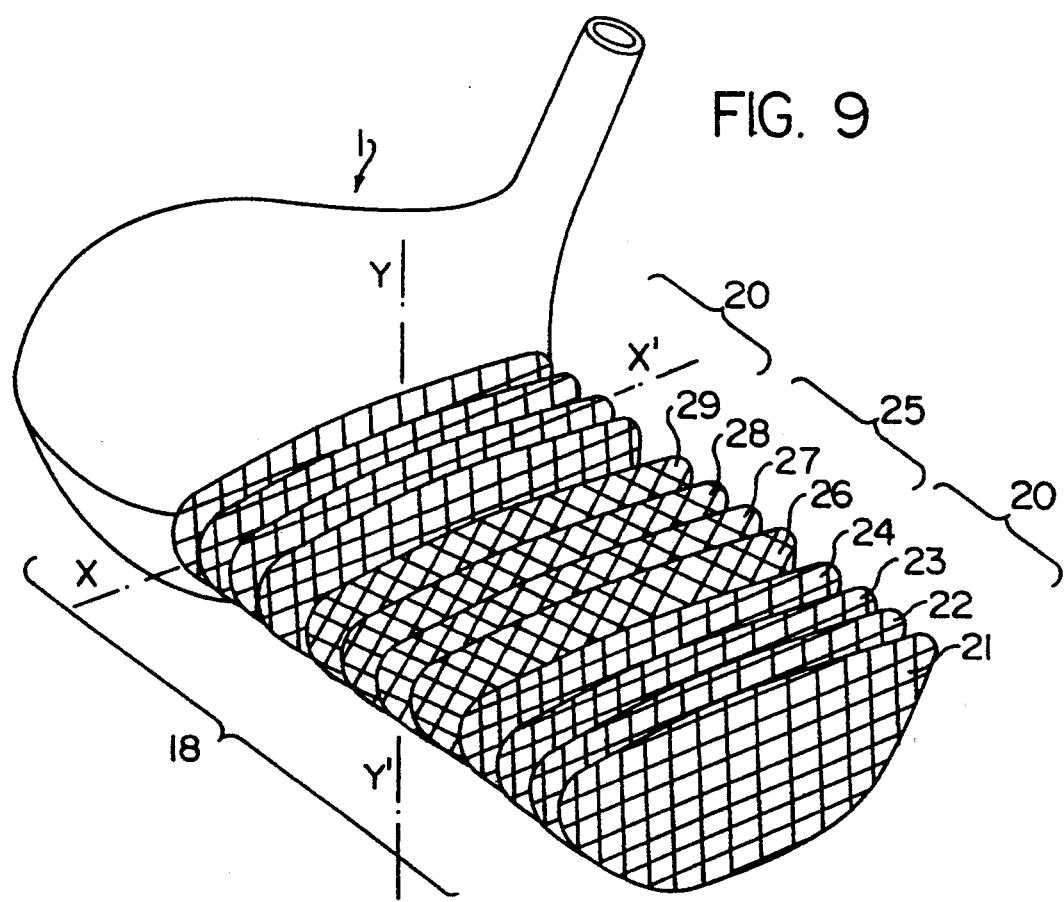

In order to optimize the strength of the plate 18, applicants have specified an especially advantageous sequence of first and second sheets (20 and 25), in accordance with an embodiment shown in FIG. 8. Thus, the plate comprises a sequence consisting of a first outer layer 20a of initial sheets 20, whose fibers are oriented along the axes X—X′ and Y—Y′; of a second, intermediate layer of second sheets 25, whose fibers are oriented at an angle of +45° and −45° to the axis X—X′; and of a third, inner layer 20b of initial sheets 20, whose fibers are oriented along the axis X—X′ and the axis Y—Y′. The second, intermediate layer comprises between approximately 3 and 9 sheets.

The first, outer layer 20a is designed to resist compression stresses caused by the shock of the ball, and the third, internal layer 20b is designed to resist tractive stress. These stresses run mainly in the direction of the axes X—X′ and Y—Y′. The second, intermediate layer 25 is designed to resist shear stresses which are generated in the neutral fiber and which run principally at an angle of +45° and −45° to the axis X—X′.

An example of the construction of a resistant plate 18 made of a composite material and of its mechanical properties can be provided.

The plate is made of a stack of sheets woven, in balanced fashion, of carbon fibers and of epoxy resin. The fiber/resin volume ratio is 1. The thickness of a sheet is 0.2 mm. The fibers possess a modulus of elasticity of 230 GPa and a rupture strength of 4,410 MPa (T300J fiber made by TORAY).

The stack is constituted by a first, outer layer (20a) made of six sheets woven from fibers extending in the direction of the axes X—X′ and Y—Y′ (orientation termed "0°, 90°"'); of a second, intermediate layer 25 of five sheets woven from fibers extending at +45°, −45° to the axis X—X′; and of a third, inner layer 20b made of six sheets woven from fibers extending at 0°, 90°.

It may also be specified that a construction comprising a second, intermediate layer of three or fewer sheets only in the area of the neutral fiber is not sufficiently resistant to the shock of the ball and leads to breaking of the plate 18. This rupture phenomenon is also observed in a construction incorporating a second, intermediate layer of nine or more sheets of fibers extending at +45°, −45°, which partially replace the sheets woven of fibers at 0°, 90°.

In this case and in contrast to the embodiments previously described, the shell 1, and specifically its front plate 8, contribute to the mechanical strength and to the stiffness of the hitting plate 18. In addition, the front plate 8 acts as a bonding support for the hitting plate 18. The thickness "e2" of the front plate 8 may be between approximately 1 and 3.5 mm. The thickness "e1" of the composite hitting plate 18 may be between approximately 1 and 5 mm. Finally, to prevent oversizing leading to increased weight of the hitting plate, the total thickness "e" equal to the sum of "e1" and "e2" must not exceed approximately 7 mm if "e1" falls between 3 and 5 mm, and "e" must not exceed 5.5 mm if "e1" is between 1 and 2 mm only.

Two embodiments of the process for manufacture of the club head will now be described.

In a preliminary step (FIG. 10) common to these different processes, the casing 4 of the head and its neck 3 are made of steel. During this step, an upper sub-assembly 30 and the lower plate 6 are molded separately. This upper sub-assembly 30 comprises the upper plate 5, the front plate 8, the peripheral plate 7, and the neck 3. The lower plate 6 is then welded to the upper sub-assembly so as to form the actual shell of the head (FIG. 10).

In a first manufacturing process illustrated in FIGS. 11 to 16, the hitting plate 18 is cut (FIG. 11) from a flat base plate 34 having a thickness "e3", which has been previously manufactured and polymerized. This base plate is, obviously and for example, formed from a stack of different resin-impregnated sheets, as previously described. In a next step (FIGS. 12 and 13), the plate element designed to form the hitting plate 18 is positioned against the support face 11 of the head, in a front recess 17 provided for that purpose, in order to be bonded to it. Bonding is effected by means of an adhesive bonding film 33, such as that shown in dotted lines in FIG. 11, and by heating and compression in a mold.

The adhesive bonding film 33 could be made of a layer of a heat-fusible polymer or grafter co-polymer-based material.

In a subsequent step (FIG. 14), the final curved shapes (C'V, C'H) of the hitting surface 2 are made by machining its front surface 200, by removing material by machining, grinding, or grinding with emery, the additional material being represented by cross-hatching in FIGS. 15 and 16. Emery grinding (FIG. 14) of the surface can be performed using a belt 150 made of an abrasive material, or else using an abrasive wheel.

In a variant of the process illustrated in FIGS. 17 to 21, the hitting plate 18 is made separately in a mold. The hitting plate 18 thus produced is then, for example, bonded against the support face 11 of the front plate, as indicated previously. Molding of the hitting surface 18 is achieved by stacking thirty pre-impregnated sheets in a mold 35 (FIG. 17). Molding is effected under heat and compression (FIG. 18), thus ensuring polymerization of the impregnation resin. The plate 18 thus molded to final shape by virtue of the mold impression is then removed from the mold, in order to be bonded to the support face 11 of the casing. It is evident that, in a subsequent operation, the final curved shape of the hitting surface is made as indicated in the preceding process and as illustrated in FIGS. 14, 15 and 16.

Machining by grinding the hitting surface 2 (FIGS. 15 and 16) with emery makes it possible to obtain horizontal curves (C'H1, C'H2, C'H3, etc.) and vertical curves (C'V1, C'V2, C'V3, etc.) of this surface. The horizontal curves may be made in a first machining operation, then the vertical curves, or vice versa. The horizontal and vertical curves may also be produced simultaneously.

It is evident that the parallel grooves which must be provided in the hitting surface 2 may subsequently be produced by machining.

The hitting plate 18 may also be made of a plastic material and manufactured separately to its final shapes and dimensions, for example by injection of a thermoplastic material. The hitting surface thus produced is then adhesively bonded to the corresponding support face. Moreover, the plate called for in the procedure illustrated in FIG. 11 may be made of a plastic material.

What is claimed is:

1. A process for manufacture of a golf club head comprising a mounted hitting plate (18), said process consisting of the steps of:
    (a) manufacturing a body of the head itself from an upper wall (5), a lower wall (6), a peripheral wall (7) and a front wall (8) comprising a front support face (11);
    (b) bonding a hitting plate (18) made of a plastic or composite material on said front support face (11); and
    (c) imparting to a hitting surface (2) of said hitting plate a curved shape which is convex toward the front.

2. The process for manufacture of a golf club head according to claim 1, wherein said hitting plate (18) is constituted by a stack of sheets woven of resin-impregnated carbon and/or aramid fibers.

3. The process for manufacture of a golf club head according to claim 2, wherein said hitting plate (18) is cut from a plate (34) before being bonded on said support face (11).

4. The process for manufacture of a golf club head according to claim 3, wherein said hitting plate (18) is first molded separately in a mold (35, 36), and is then bonded to said support face (11).

5. The process for manufacture of a golf club head according to claim 1, wherein, in a subsequent step, said front surface (200) of said hitting plate (18) is machined in order to give it a horizontal curvature (C'H1, C'H2, C'H3).

6. The process for manufacture of a golf club head according to claim 1, wherein, in a subsequent operation, said front surface (200) of said hitting plate (18) is machined, so as to give it a vertical curvature (C'V1, C'V2, C'V3,).

7. The process for manufacture of a golf club head according to claim 6, wherein said horizontal curves (C'H1, C'H2, C'H3, etc.) and vertical curves (C'V1, C'V2, C'V3, etc.) are machined simultaneously.

8. The golf club head produced using the process according to claim 1.

* * * * *